(12) United States Patent
Yun

(10) Patent No.: US 7,883,747 B2
(45) Date of Patent: Feb. 8, 2011

(54) METHOD FOR MANUFACTURING SHARP SPINE-SHAPED PROJECTIONS ON CERAMIC

(76) Inventor: Ju Cheol Yun, 698-7, Jichuk-dong, Deokyang-gu, Goyang-si, Gyeonggi-do (KR) 412-815

( * ) Notice: Subject to any disclaimer, the term of this patent is extended or adjusted under 35 U.S.C. 154(b) by 813 days.

(21) Appl. No.: 11/901,406

(22) Filed: Sep. 17, 2007

(65) Prior Publication Data
US 2008/0073814 A1    Mar. 27, 2008

(30) Foreign Application Priority Data
Sep. 18, 2006   (KR)   ...................... 10-2006-0090118

(51) Int. Cl.
*C04B 33/24* (2006.01)
(52) U.S. Cl. ...................... 427/260; 427/355
(58) Field of Classification Search ................ 427/355, 427/260, 261, 269, 279; 428/34.1, 34.4, 428/446, 141–173; 264/114; 434/82
See application file for complete search history.

(56) References Cited
FOREIGN PATENT DOCUMENTS

| | | | |
|---|---|---|---|
| JP | 06072072 B | * | 9/1994 |
| JP | 2001238781 A | * | 9/2001 |
| KR | 2002-0011831 | | 2/2002 |
| KR | 1020000045410 | * | 2/2002 |
| KR | 2003-0036122 | | 5/2003 |
| KR | 1020020085722 | * | 5/2003 |

* cited by examiner

*Primary Examiner*—Michael Cleveland
*Assistant Examiner*—Tabatha Penny
(74) *Attorney, Agent, or Firm*—Gerald E. Hespos; Michael J. Porco

(57) ABSTRACT

A method for manufacturing sharp spine-shaped projections on ceramic includes forming projections by applying a first soil water on the outside of the half-dried ceramic, forming projection roots; and growing projections by applying a second soil water on a plurality of the projection roots fifty to one hundred times using the brush and letting the projections dry at 15~20° C., and 60~70% of relative humidity for 15~25 minutes in the shade after the application. Bright and mysterious various ceramic patterns are achieved by controlling water content of a first soil water to control projections density, controlling the number of a second soil water applications to control projections' size, selecting the direction of applications to form projections bent toward various directions and mixing pigments with soil water at proper time with proper mixing ratios to form projections with various colors.

20 Claims, 10 Drawing Sheets

METHOD FOR MANUFACTURING SHARP SPINE-SHAPED PROJECTIONS ON CERAMIC

This application claims priority under U.S.C. §119 of Korean Patent Application 2006-0090118, filed on Sep. 18, 2006, now Korean Patent 10-0745091 the entire contents of which are hereby incorporated by reference.

BACKGROUND OF THE INVENTION

1. Field of the Invention

The present invention relates to a method for manufacturing sharp spine-shaped projections on ceramic. More specifically, the present invention is a kind of methods for decorating ceramics in ceramics manufacturing, and relates to a method for forming a group of sharp spine-shaped projections on outside of ceramics.

2. Description of Related Art

Ceramics generally have been made by elutriating, kneading, forming, decorating, first burning, glaze applying, and second burning.

The elutriating step is a step of pulverizing clay finely, wetting the pulverized clay, sifting the wet clay to remove the contaminants, taking settled clay, and drying settled clay in the shade, and the kneading step is a step of adding proper amount of water into the dried clay and kneading the mixture by hands or a rice-cake mallet. By well kneading, clay can be soft, air can be removed, and it prevents ceramics expanding and breaking during the burning steps.

The forming step is a step of forming a shape of ceramic, and it can be done with a Potter's wheel or a mould. In a Potter's wheeling, the base is made by drying the formed ceramic for about a day and cutting the lower part of the ceramic.

The decorating step is a step of decorating the formed, but not yet fully dried ceramic with various patterns on outside of the ceramic, and there are known, various decorating methods. For example, seven decorating methods for a grayish-blue-powdered celadon have been known as inlaying, printing, thin papering, engraving, carving, paint brushing, and dipping.

The first burning step is a step of burning the ceramic at 850~900° C. first for the purpose of full-drying the ceramic, removing the contaminants in the clay and helping glazing.

The glaze applying step is a step of applying a glaze to the first burnt ceramic, and there are dipping, spraying, pouring and so on. A glaze is a kind of glass layer giving a beautiful gloss to the ceramic and preventing water passing through.

The second burning step is a step of burning the glazed ceramic at 1200~1300° C., letting the glaze fused to the ceramic, and decorating the ceramic beautifully by the glaze.

Kilns for burning can be various such as firewood kilns, gas kilns, oil kilns, and electric kilns. For burning methods, there are an oxidative burning that burns fuel completely with enough oxygen and a reduction burning that burns fuel incompletely by blocking the oxygen supply.

Meanwhile, changing conditions of the times have expected ceramics to be from simple 'art crafts' to 'industry applicable products' having a sense of beauty more and more.

To meet the expectancy and satisfy various customers' desire, new ceramic manufacturing technologies have been developed in a steady stream. For example, Korean Patent Publication No. 10-2002-0011831 disclosed the method of forming projection patterns on the craft by manipulating the mixing ratios of soils and glazes, and kiln temperature on second burning, and letting the glaze layer change on the ceramic surface. Korean Patent No. 10-480370 disclosed a manufacturing method ceramic tea-things having projections for the finger-pressure with sharp ends by making irregular engravings of under 5 mm diameter on the whole surface of the ceramic, applying porridge-like decorating material made of white clay onto the surface of the engravings with a brush, letting the engravings filled with the decorating material and forming projections for finger-pressure with sharp ends.

However, the former technology has the problem that projections are very small and shapes of projections are not various. So, it is difficult to get desired various patterns. The latter technology has a finger-pressure effect. However, it reduces a sense of beauty and customers' desire to buy.

SUMMARY OF THE INVENTION

Therefore, the present invention is an application of the traditional Gwiyal (a kind of paintbrush) technique in the decorating step, and it is directed to a new method for manufacturing various sharp spine-shaped projections on the outside of ceramic.

To achieve the object, the present invention is characterized by a method for manufacturing sharp spine-shaped projections on ceramic comprising elutriating, kneading, forming a ceramic and decorating the ceramic, wherein the decorating step includes: forming projections by applying a first soil water on the outside of the half-dried ceramic using a rough brush and forming a plurality of projection roots; and growing projections by applying a second soil water on a plurality of the projection roots fifty to one hundred times using the brush and letting the projection roots dry at 15~20° C., and 60~70% of relative humidity for 15~25 minutes in the shade each time after the application.

This invention is application of the traditional Gwiyal technique, and the Gwiyal technique is one of conventional grayish-blue-powdered celadon patterning technique, and it is the technique to create patterns by putting Gwiyal (a kind of paintbrush i.e. wide and rough brush or broom) dipped in the white clay to the spinning ceramic on the spinning disc and making traces.

The present invention uses the Gwiyal technique, however, unlike conventional methods of repeating application-drying one or two times, it is a method of creating new ceramic patterns of sharp spine-shaped projections by applying a first soil water on the outside of the half-dried ceramic to form projection roots properly (it is a step of forming projections) and applying a second soil water on the ceramic formed the projection roots repeatedly and letting them dry each time after the application to grow the projections by desired size (it is a step of growing projections). Therefore, it is possible to add proper pigments to the soil water at proper time and produce various colors, and it can embody various bright and mysterious ceramic patterns.

Reference number 10 is a ceramic, 12 is a region where projection roots have not been yet formed, 20 is a rough brush, 32, 34, 36, and 38 are projections, 40 is the region where big projections were formed, and 50 is the region where small projections were formed.

DETAILED DESCRIPTION OF THE PREFERRED EMBODIMENTS

A detailed description of preferred embodiments of the present invention is provided with respect to the accompanying drawings. It must be comprehended that the following preferred embodiments are exemplary only to help understand the present invention and not to limit its interpretation.

FIGS. 1a to 1e show one embodiment of a method for manufacturing sharp spine-shaped projections on ceramic according to the present invention.

Figure 1A:
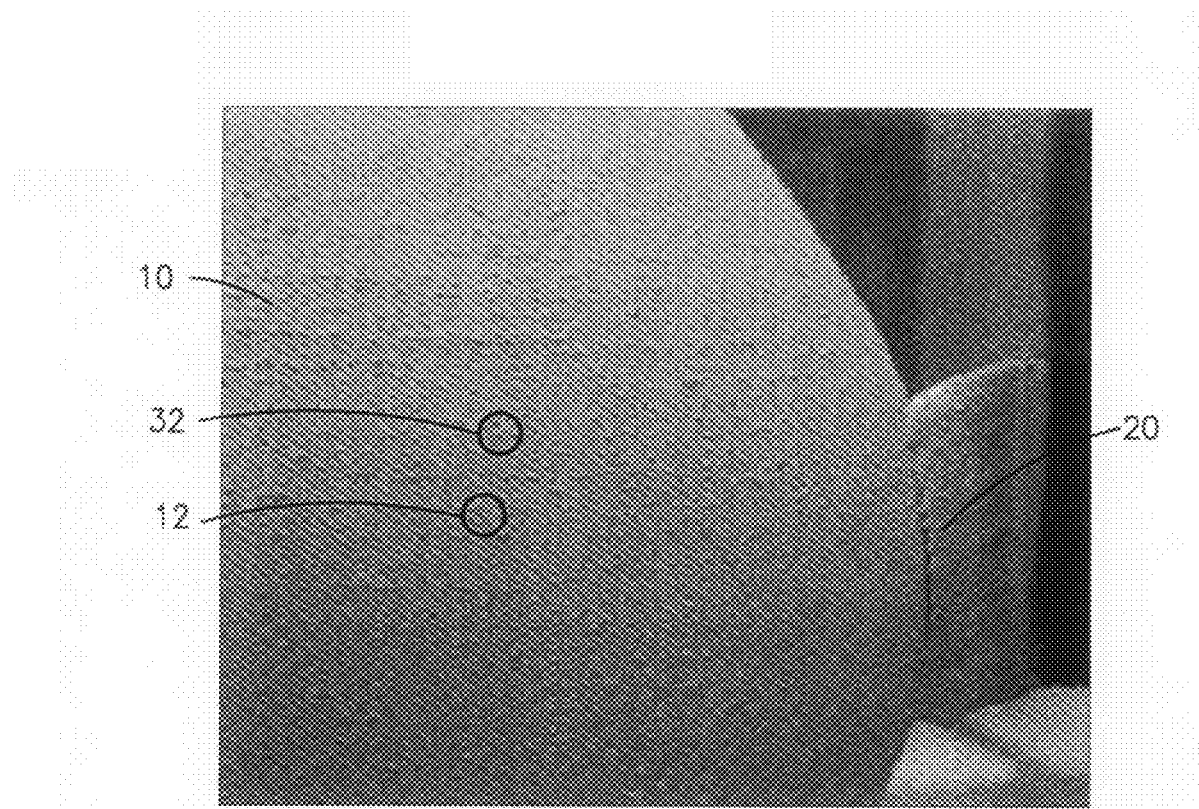
FIGS. 1a to 1e show one embodiment of a method for manufacturing sharp spine-shaped projections on ceramic according to the present invention.

First, as shown in FIG. 1a, projection roots 32 are formed properly by applying a first soil water on the outside of half-dried ceramic 10 formed by a cast or a Potter's wheel using a rough brush 20. Reference number 12 shows the ceramic surface where projection roots have not been yet formed.

The number of projection roots 32 can be different according to water content of the first soil water. The less water content of the first soil water is, the more projection roots are formed. The more water content of the first soil water is, the less projection roots are formed. For example, when water content of the first soil water is 15%, fifty to sixty projection roots per 5 cm×5 cm are formed, and when water content of the first soil water is 20%, twenty to thirty projection roots per 5 cm×5 cm are formed. Therefore, the number of projection roots 32 can be controlled by water content of the first soil water.

Then, a plurality of projection roots are formed on the surface of the ceramic. After a drying treatment, a second soil water is applied to the ceramic including the projections repeatedly, and then the projections are grown by desired size, as shown in FIGS. 1b to 1d.

Drying process accompanied with the applying a second soil water to the ceramic repeatedly should be done at 15~20° C., and 60~70% of relative humidity for 15~25 minutes in the shade. When the temperature and the relative humidity are below the range, drying can be proceeded quickly, the projections can be formed fine and it is difficult to get the projections of desired shape. When the temperature and the relative humidity are over the range, drying can be proceeded slowly and it takes too long to make the desired ceramic because repeated application of soil water is required to get desired projections. Therefore, it is preferable to dry the ceramic at 15~20☐, and 60~70% of relative humidity for 15~25 minutes in the shade.

As stated above, soil water application accompanied with drying can make the second soil water be absorbed effectively and let the projections grow. The projections grow about 0.3 mm each application.

Figure 1B:
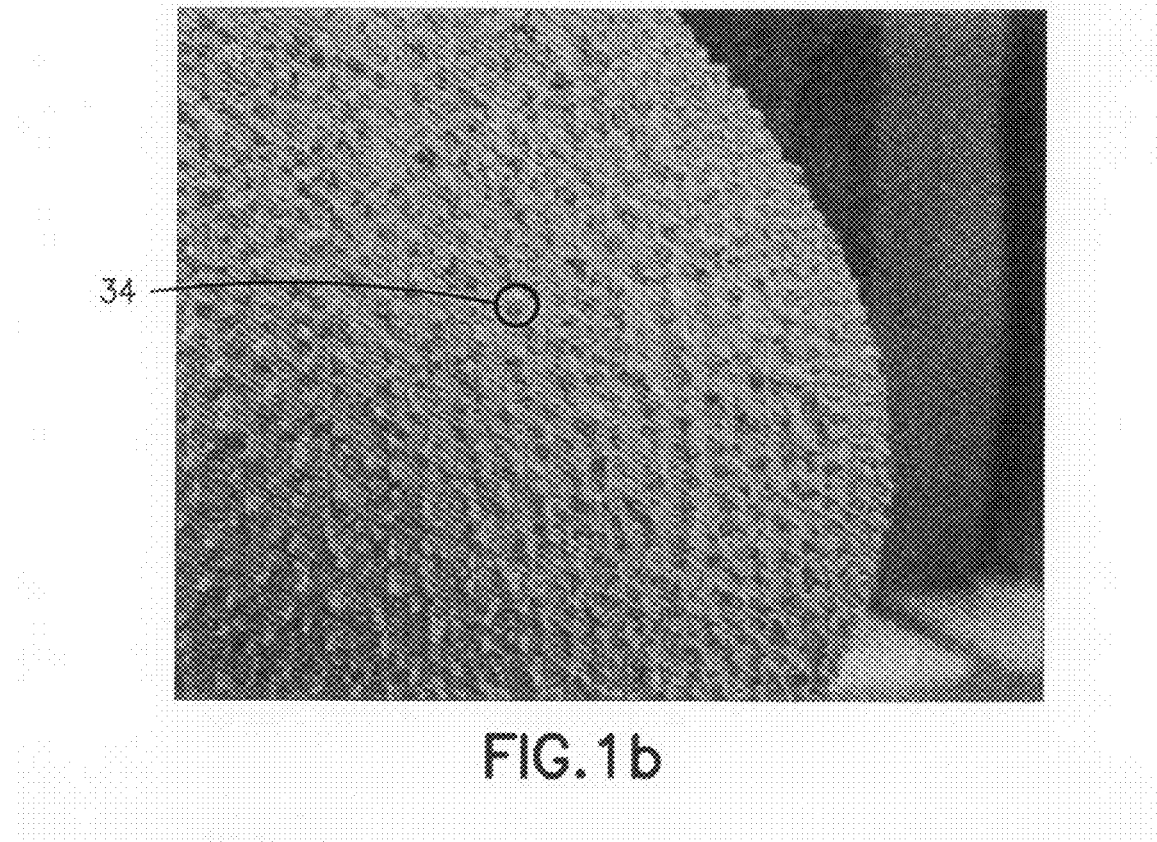
Figure 1C:
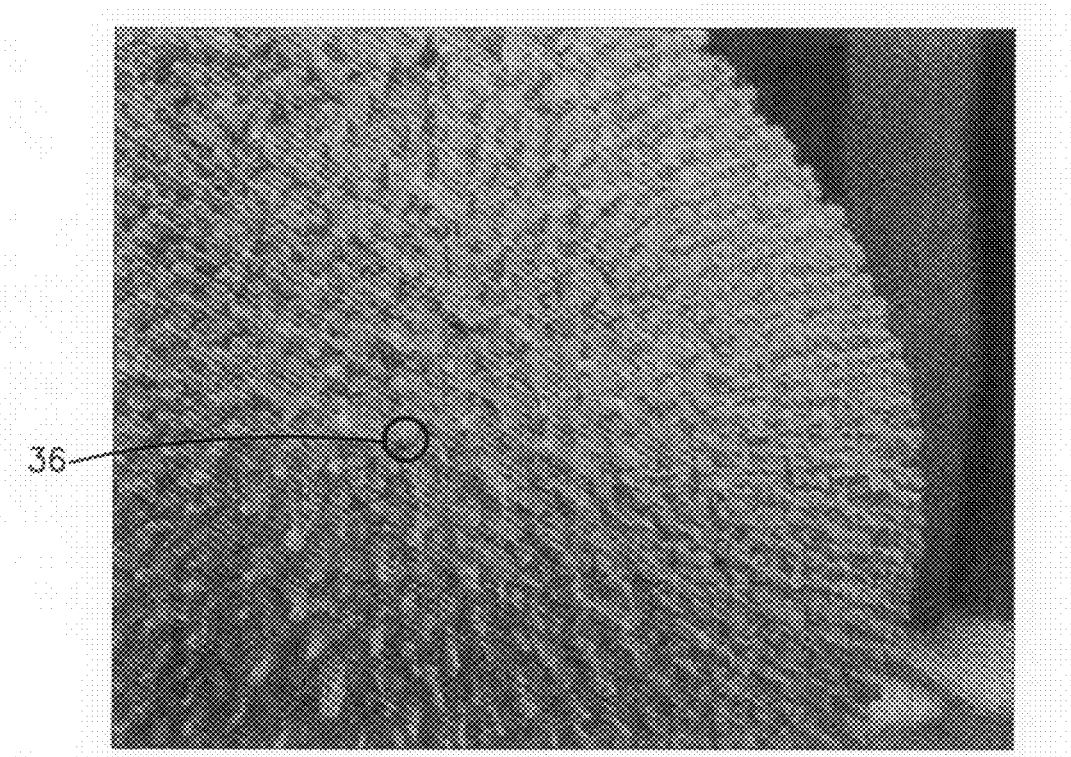
Figure 1D:
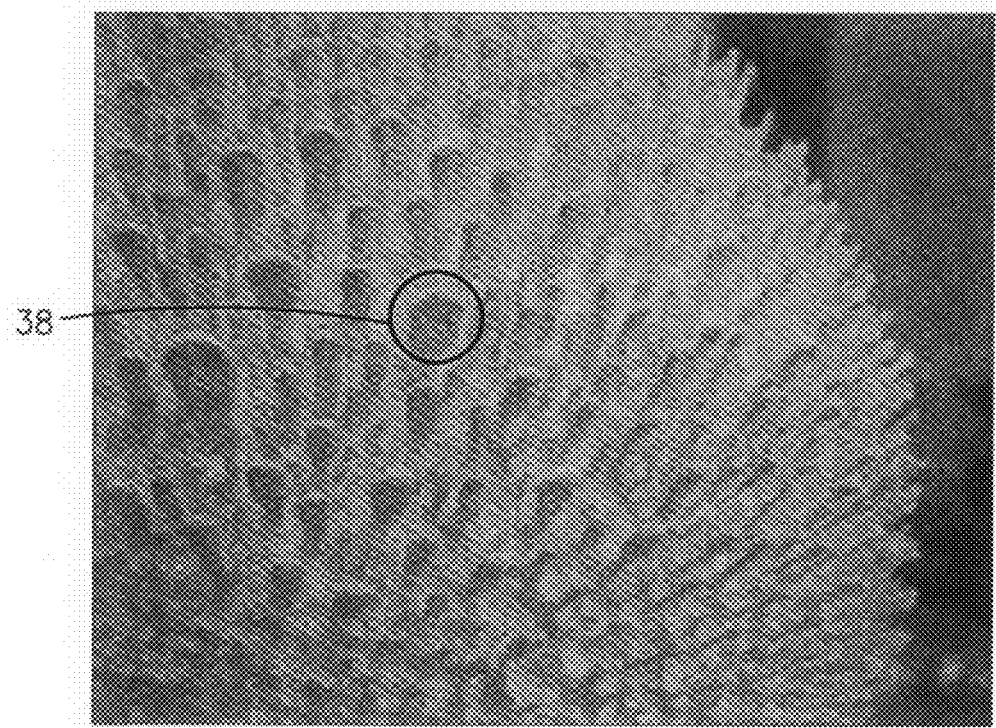

After around twenty times repeat of application and drying, as shown in FIG. 1b, the projections 34 grow significantly on the ceramic surface. Then, it is preferable to seal the ceramic with a specific means such as a vinyl cloth wrapper for about 12 hours and conform water content of the projections to water content of the ceramic body rather than to apply the second soil water continuously. It can prevent projections from being broken during the process.

It is preferable that water content controlling is done in mid course in consideration of the desired projection size, in words, the number of total second soil water applications.

As stated above, after controlling water in the projections and the ceramic body, it is preferable to apply a second soil water repeatedly without direction or with a specific direction with controlling water content of a second soil water. "Without direction" means not to apply a second soil water with a specific direction, and it is in order to grow projections vertically. The specific direction means one selected from directions of upward, downward, right, left, from right upside to left downside, from left downside to right upside, from left upside to right downside, and from right downside to left upside. It means to apply soil water in order to let the upper part of projections grow bent to the desired direction.

Moreover, after the step of controlling water content, it is preferable to increase water content at a rate of 0.2~0.4% per application or 2~4% per 10 applications and be careful for the projections not to be broken and to grow toward desired direction, when the second soil water is applied twenty-five to fifty times repeatedly, to control water content in the second soil water starting from 20% to 30% at the end.

FIG. 1c shows the application process on the ends of the projections toward desired direction. The fact that the projections 36 of FIG. 1c were grown further than those of FIG. 1b can be seen. Like this, total fifty to one hundred times applications of the second soil water can be done to grow the projections about 1.5~3 cm. The number of the second soil water applications can be different according to the size of desired projections, and therefore, it is not limited to the above number.

Then, as shown in FIG. 1d, when the projections are grown by the desired size, desired colors can be added to the upper part of plurality of grown projections 38 by applying a third soil water including 1~13% pigment with a brush. When the pigment content is under 1%, it is difficult to raise the pigment's own color. When the pigment content is over 13%, it is difficult to change the pigment's color freely. Colors can be changed according to the mixing ratio of pigments, and it is preferable to determine the desired color and the mixing ratio of pigments in advance.

Figure 1E:
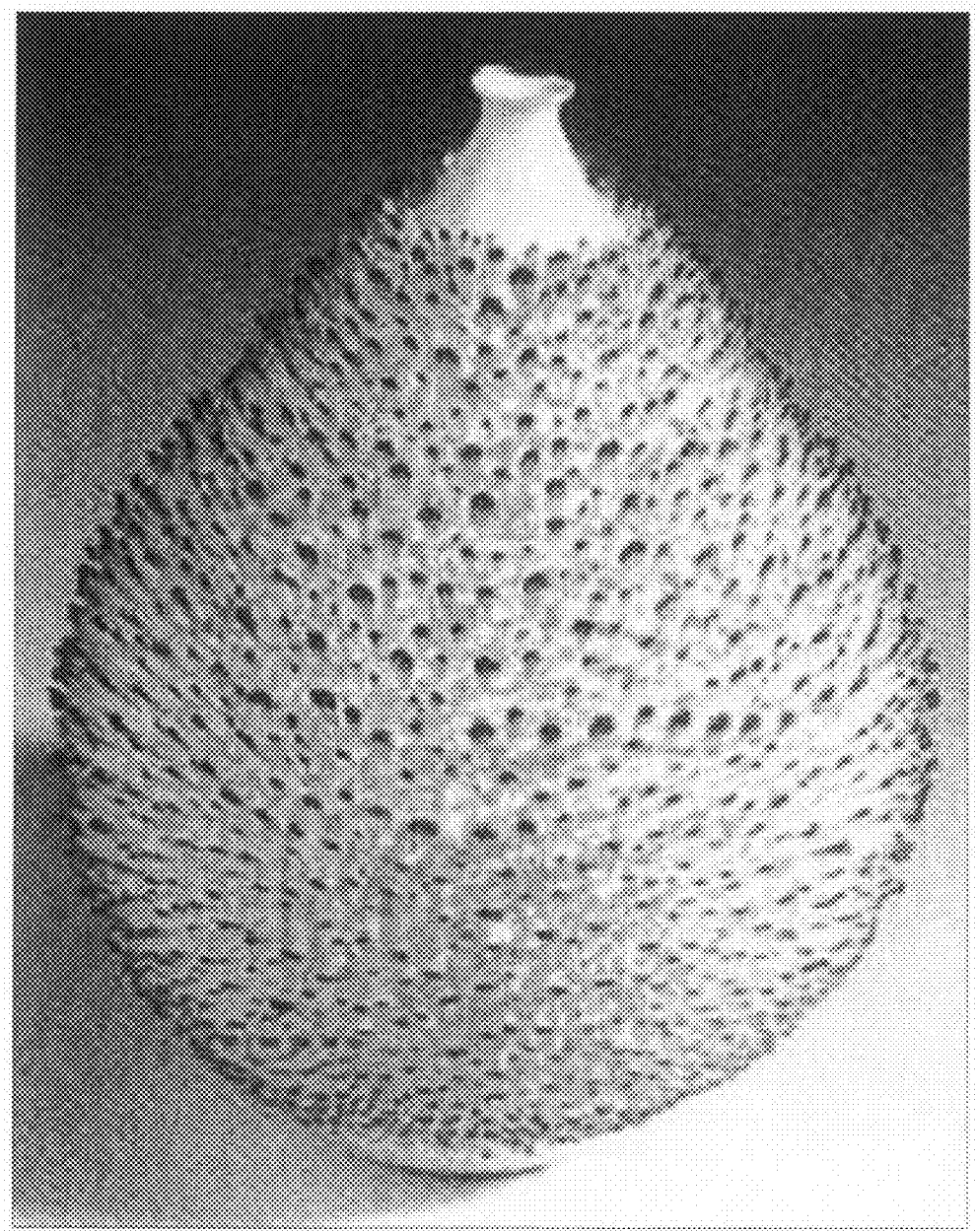

As stated above, after coloring the projections for the last step (in the coloring step, multiple applications with various colors can be applied as well), first burning, glaze applying and second burning, unique ceramic patterns with colors only in the end of the projections can be embodied as shown in FIG. 1e.

The first burning, glaze applying and second burning can be done by conventional ways, and therefore, detailed descriptions are omitted here. However, it is preferable that the first burning temperature is 900° C., the glaze applying is spraying, and the second burning temperature is 1250° C.

Figure 2:
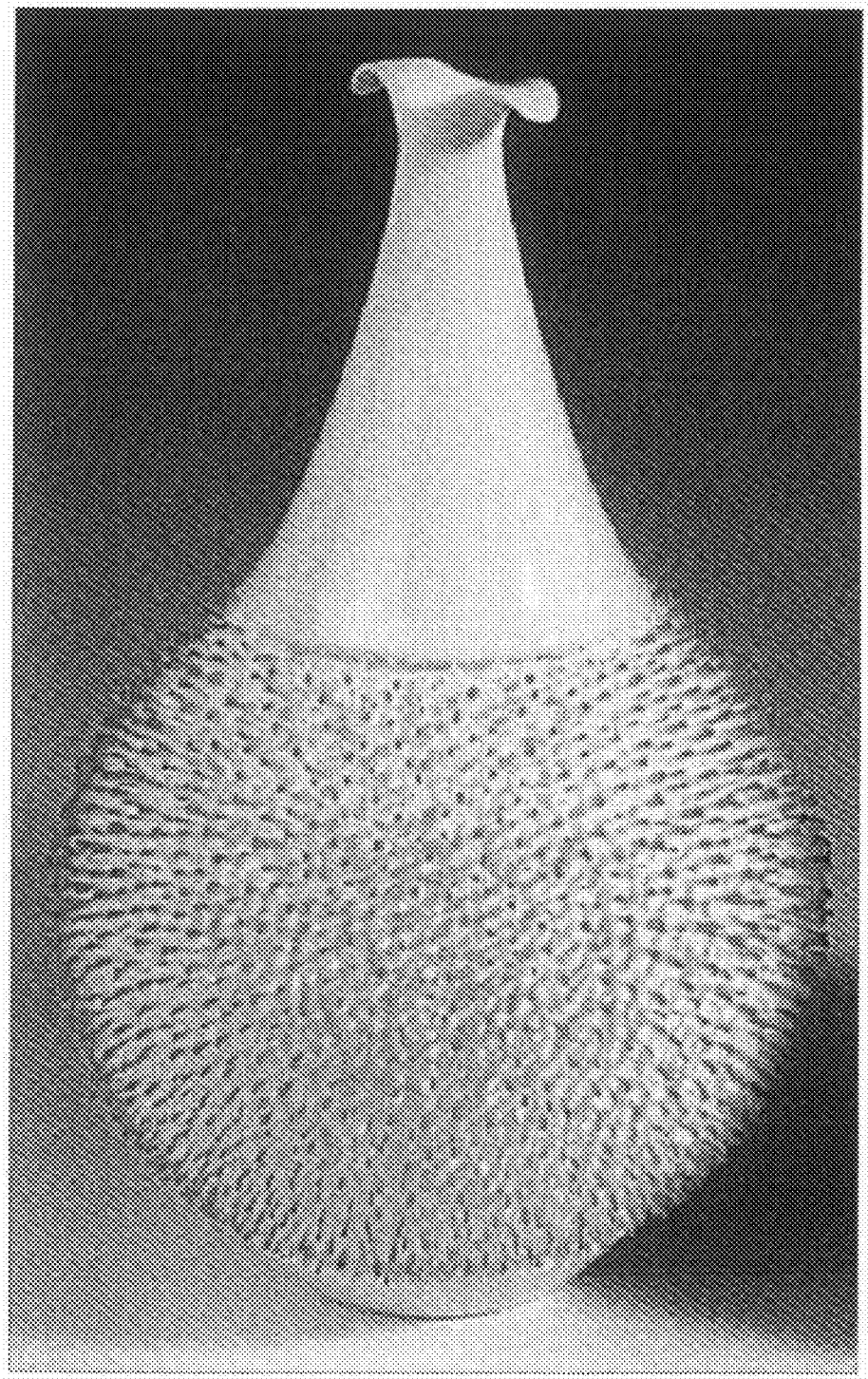
FIGS. 2 to 8 show various embodiments with various patterns according to the present invention.
Figure 3:
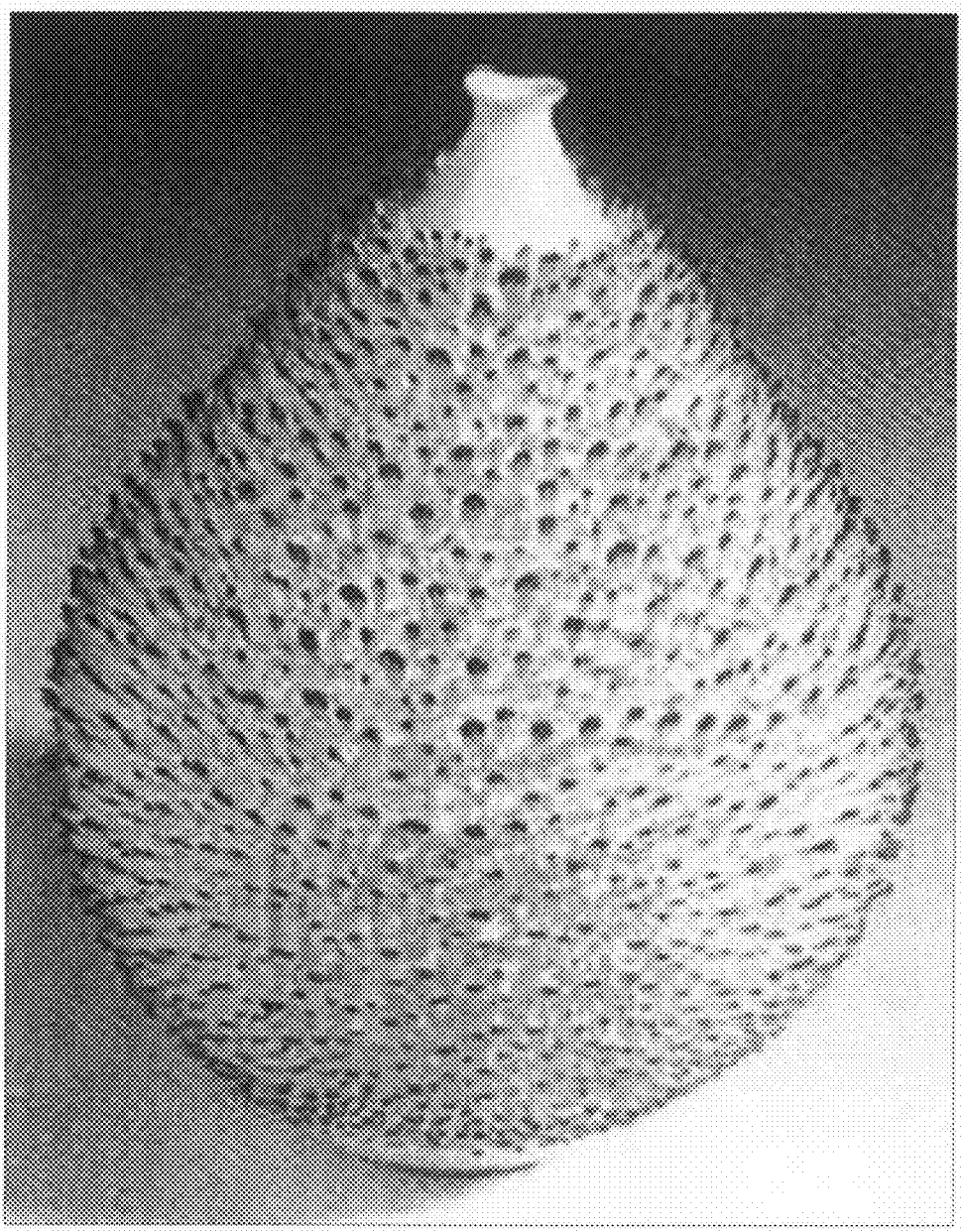
Figure 4:
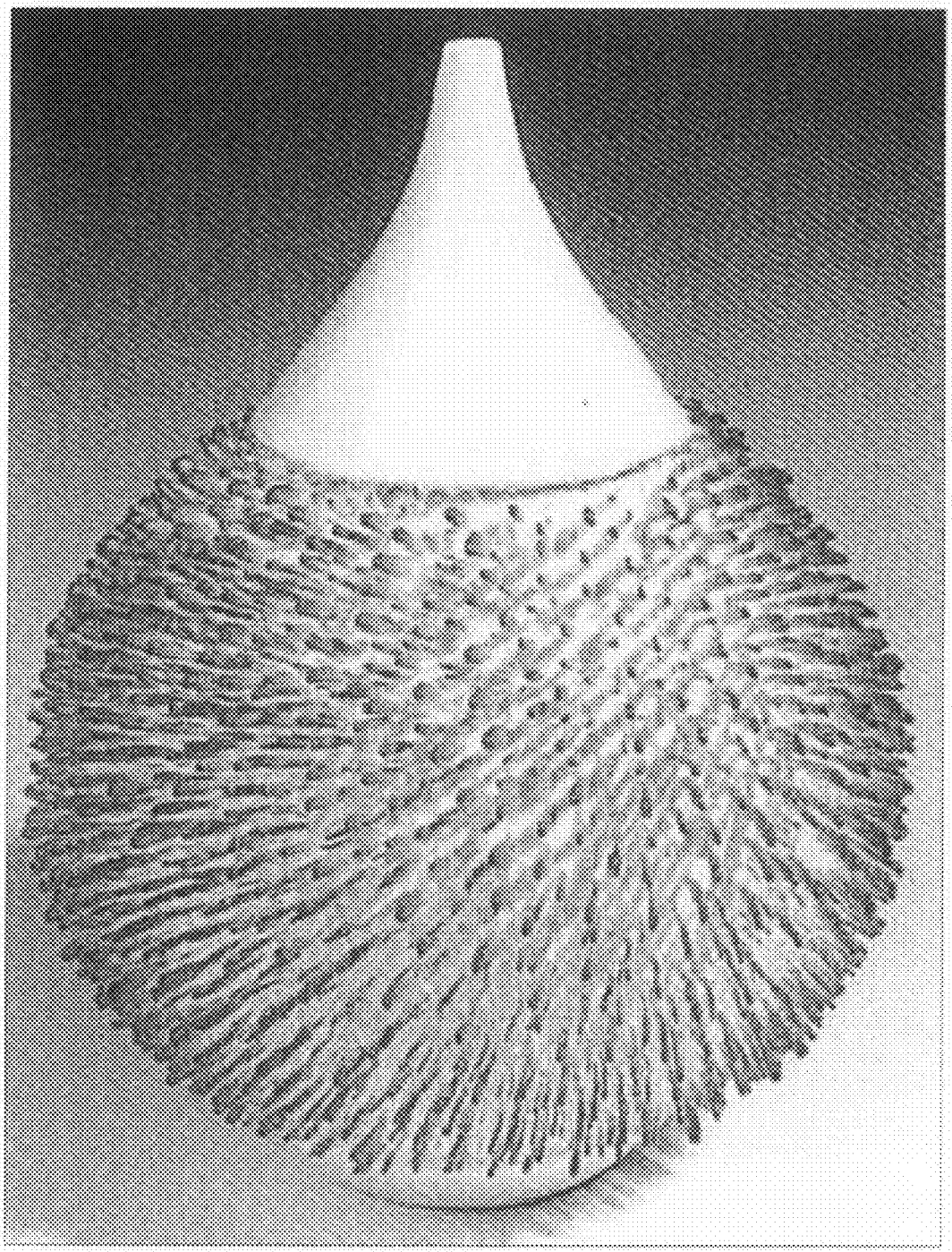

Finally, according to the present invention, as shown in FIG. 2 to FIG. 4, projections can be formed variously such as vertically (FIG. 2), upwardly (FIG. 3), or from right upside to left downside (FIG. 4).

Figure 5:
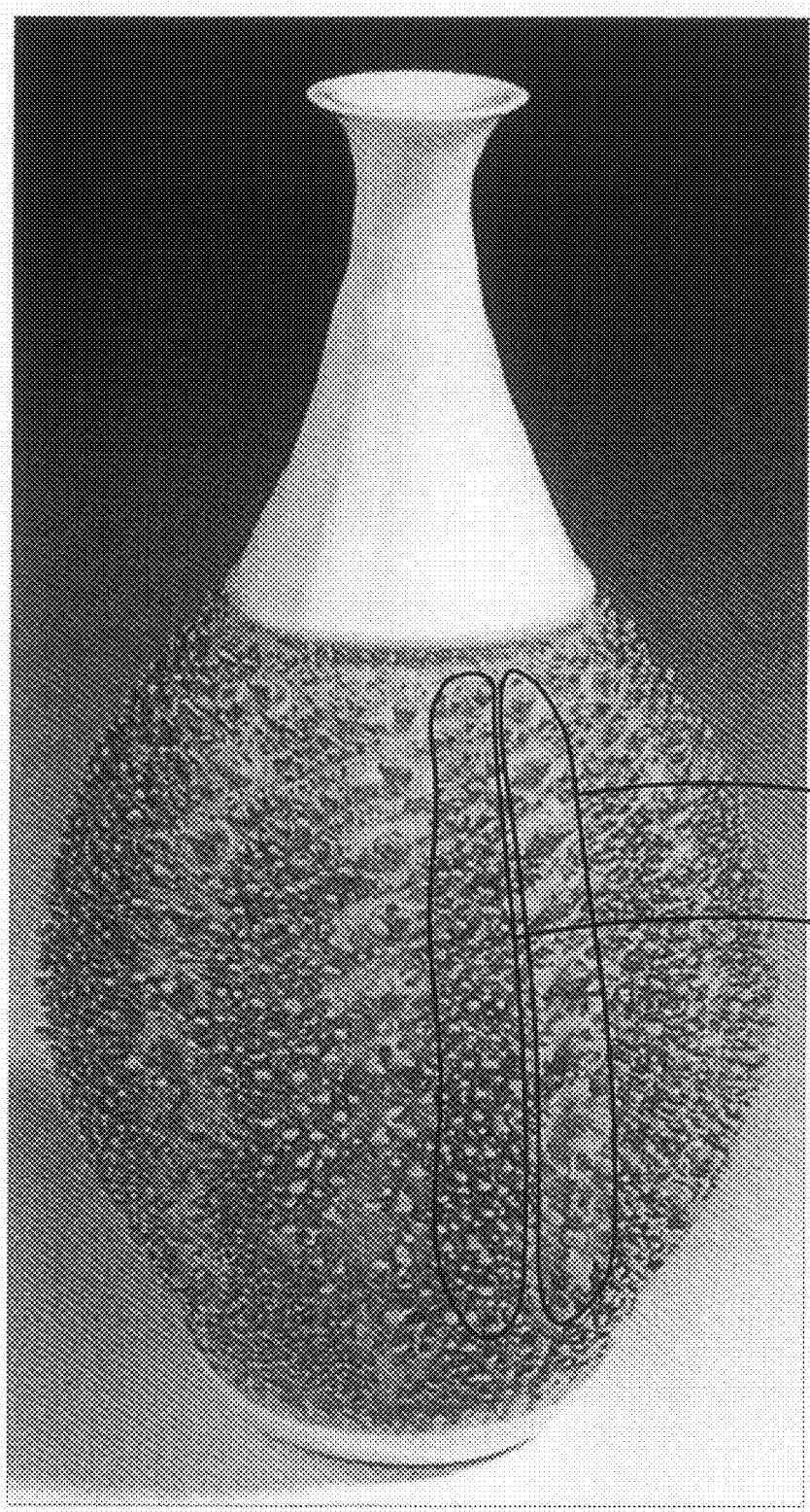
Figure 6:
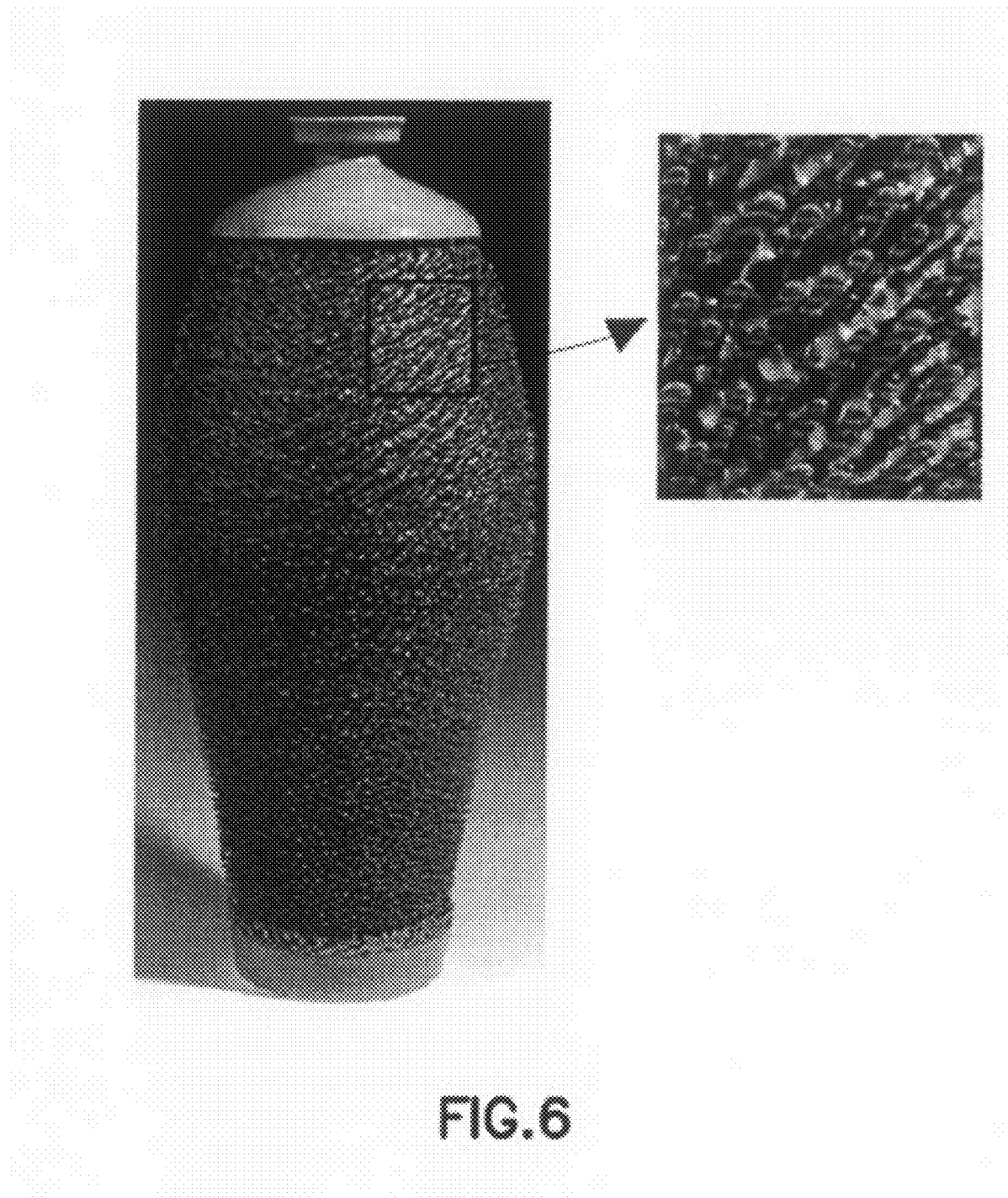

In addition to the embodiment, a first soil water and a second soil water can include the same ratio of pigments as in the third soil water, and projections with colors like FIG. 5 and FIG. 6 can be formed in another embodiment of the present invention.

Furthermore, as shown in FIG. 5, thickness of projections can be formed variously by dividing the ceramic into the region 40 where big projections are formed and the region 50 where big projections are not formed, and forming projection roots with a first soil water in the step of forming projections.

Projections with two or more colors, as shown in FIG. 6, can be formed by applying different color pigments in the second soil water at regular intervals repeatedly.

Figure 7:
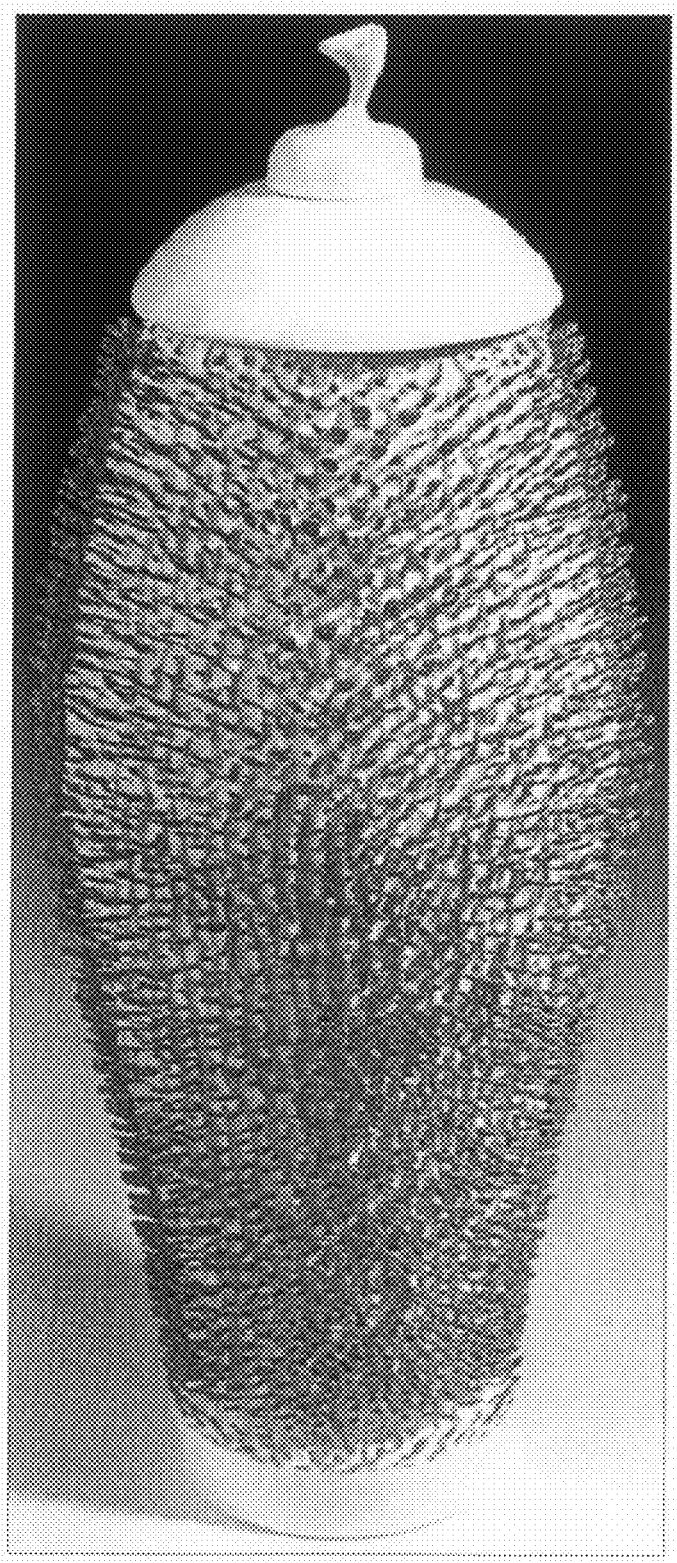
Figure 8:
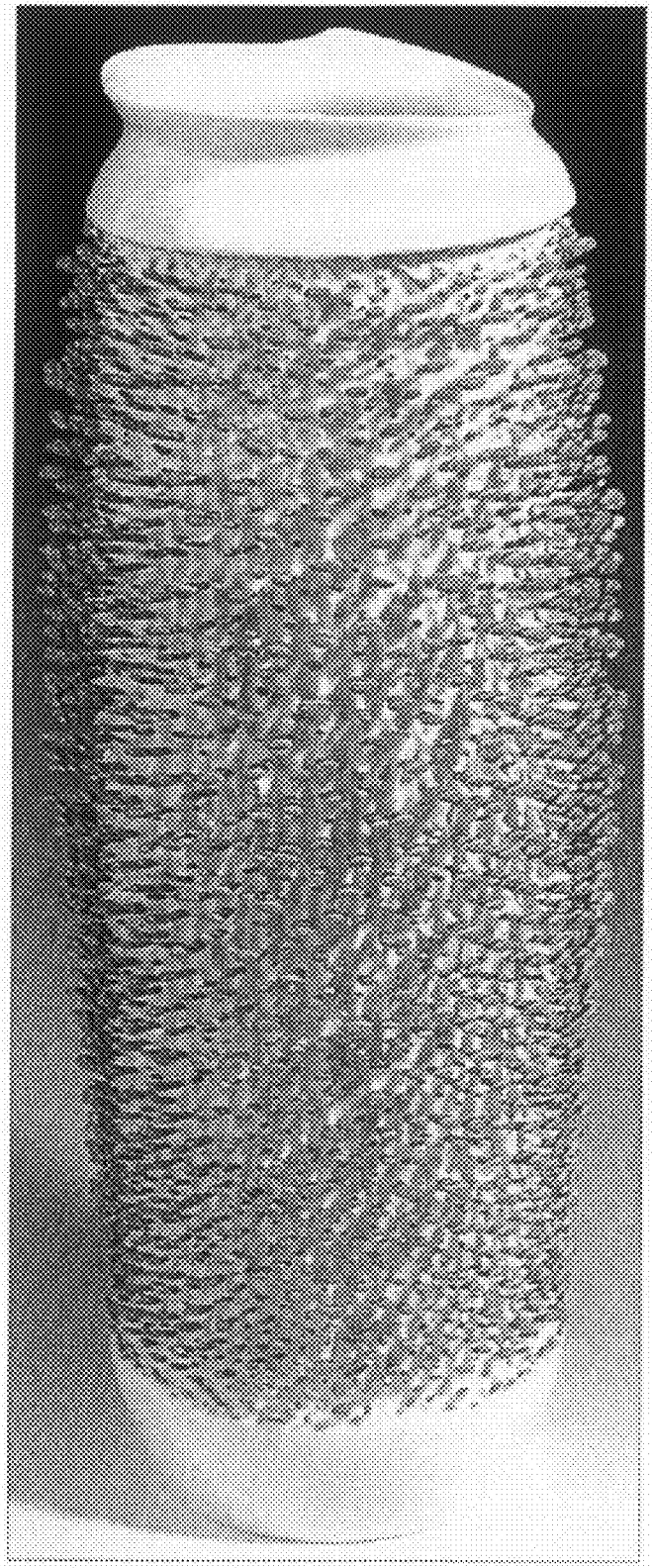

Furthermore, white ceramic body and colored projections, as shown in FIG. 7 and FIG. 8, can be formed by a first soil water without a pigment and a second soil water mixed with pigments from the start.

Because FIG. 7 shows that fifty to sixty projections per 5 cm×5 cm are formed when water content is 15%, and FIG. 8 shows that twenty to thirty projections per 5 cm×5 cm are formed when water content is 20%, FIG. 7 and FIG. 8 are good embodiments showing that the number of projections is different according to the water content in a first soil water.

In all the embodiments, it is preferable that more than one selected from a first to a third soil water include 0.1~1% sodium silicate. Sodium silicate dissolves well in water which is strong polar, functions as a deflocculant which make soil water maintain its suspension state. Therefore, it is essentially preferable that a second soil water and a third soil water which should be applied repeatedly with the same soil water include sodium silicate. When sodium silicate is under 0.1%, it does not function as a deflocculant for soil water. When sodium silicate is over 1%, soil water can coagulate. Therefore, the amount of sodium silicate can be different according to the soil, and it is preferable that the amount of sodium silicate is 0.3~0.5%.

In all the embodiments, it is preferable that one selected from a first to a third soil water is low ferrous porcelain soil for casting, and the amount of porcelain soil in each soil water should be selected according to the function of soil water. In words, because a first soil water forms projection roots on the ceramic, 79~84.9% is preferable (when pigments are included, 66~83.9% is preferable). When the amount of porcelain soil in a first soil water is under the range, projection roots are not formed well or formed sparsely. When the amount of porcelain soil in a first soil water is over the range, projection roots are formed densely. Because a second soil water make projections grow by application and drying repeatedly, 69~79.9% is preferable (when pigments are included and coloring is done at the same time, 56~78.9% is preferable). Because a third soil water should give the grown projections desired colors, 56~78.9% is preferable.

Finally, a first soil water comprises 79~84.9% porcelain soil, 15~20% water and 0.1~1% sodium silicate, a second soil water comprises 69~79.9% porcelain soil, 20~30% water and 0.1~1% sodium silicate and a third soil water comprises 56~78.9% porcelain soil, 20~30% water, 1~13% pigment and 0.1~1% sodium silicate. However, when pigments are mixed in a first soil water and/or a second soil water, the first soil water comprises 66~83.9% porcelain soil, 15~20% water, 1~13% pigment and 0.1~1% sodium silicate, and the second soil water comprises same as the third soil water.

In all the embodiments, the amount of each component in a first soil water to a third soil water is expressed as percent (%), and it means the weight of each component to total weight of all components.

Detailed descriptions of preferred embodiments of the present invention are provided here. It must be comprehended that the preferred embodiments are exemplary only to help understand the present invention and not to limit its interpretation. The present invention is provided as a method for decorating ceramics, but the present invention covers ceramics manufactured by the method for manufacturing sharp spine-shaped projections on ceramic under Patent Law.

By controlling water content of a first soil water to control projections density, controlling the number of a second soil water applications to control projections' size, selecting the direction of applications to form projections bent toward various directions and mixing pigments with soil water at proper time with proper mixing ratios to form projections with various colors, the present invention can embody bright and mysterious various ceramic patterns which have never been expressed by conventional techniques.

What is claimed is:

1. A method for manufacturing sharp spine-shaped projections on ceramic comprising elutriating, kneading, forming a ceramic and decorating the ceramic, wherein the decorating step includes:

forming projections by applying a first soil water on the outside of the half-dried ceramic using a rough brush and forming a plurality of projection roots; and growing projections by applying a second soil water on a plurality of the projection roots fifty to one hundred times using the brush and letting the projections dry at 15~20° C., and 60~70% of relative humidity for 15~25 minutes in the shade each time after the application;

wherein the first soil water comprises 79~84.9% porcelain soil, 15~20% water and 0.1~1% sodium silicate, and the second soil water comprises 69~79.9% porcelain soil, 20~30% water and 0.1~1% sodium silicate.

2. The method of claim 1, wherein water content of the first soil water is controlled in consideration of the number of the projection roots to be formed on the outside of the ceramic, when the number of the projection roots to be formed on the outside of the ceramic is fifty to sixty per 5 cm×5 cm, the water content is 15%, and when the number of the projection roots to be formed on the outside of the ceramic is twenty to thirty per 5 cm×5 cm, the water content is 20%.

3. The method of claim 2, wherein a coloring step is further being included, the coloring step is applying a third soil water onto the top of a plurality of the projections grown by the step of growing projections with the brush and making the projections colored with desired colors, and the third soil water comprises 56~78.9% porcelain soil, 20~30% water, 1~13% pigment and 0.1~1% sodium silicate.

4. The method of claim 3, wherein the porcelain soil in one of the selected soil water from the first to the third soil water is low ferrous porcelain soil for casting.

5. The method of claim 1, wherein the step of growing projections is further including a step of controlling water content by applying the second soil water on the projection roots twenty five to fifty times, letting them dry each time after the application, sealing the ceramic with a vinyl cloth wrapper for about 12 hours and conforming water content of the projections to water content of the ceramic body.

6. The method of claim 5, after the step of controlling water content, the second soil water is being applied repeatedly without direction or with a specific direction with controlling its water content, wherein the water content of the second soil water is controlled by starting from 20% by increasing water at a rate of 0.2~0.4% per application or 2~4% per 10 applications to 30%, and the specific direction is one selected from directions of upward, downward, right, left, from right upside to left downside, from left downside to right upside, from left upside to right downside, and from right downside to left upside.

7. The method of claim 6, wherein a coloring step is further being included, the coloring step is applying a third soil water onto the top of a plurality of the projections grown by the step of growing projections with the brush and making the projections colored with desired colors, and the third soil water comprises 56~78.9% porcelain soil, 20~30% water, 1~13% pigment and 0.1~1% sodium silicate.

8. The method of claim 7, wherein the porcelain soil in one of the selected soil water from the first to the third soil water is low ferrous porcelain soil for casting.

9. The method of claim 5, wherein a coloring step is further being included, the coloring step is applying a third soil water onto the top of a plurality of the projections grown by the step of growing projections with the brush and making the projections colored with desired colors, and the third soil water comprises 56~78.9% porcelain soil, 20~30% water, 1~13% pigment and 0.1~1% sodium silicate.

10. The method of claim 9, wherein the porcelain soil in one of the selected soil water from the first to the third soil water is low ferrous porcelain soil for casting.

11. The method of claim 1, wherein a coloring step is further being included, the coloring step is applying a third soil water onto the top of a plurality of the projections grown by the step of growing projections with the brush and making the projections colored with desired colors, and the third soil water comprises 56~78.9% porcelain soil, 20~30% water, 1~13% pigment and 0.1~1% sodium silicate.

12. The method of claim 11, wherein the porcelain soil in one of the selected soil water from the first to the third soil water is low ferrous porcelain soil for casting.

13. A method for manufacturing sharp spine-shaped projections on ceramic comprising elutriating, kneading, forming a ceramic and decorating the ceramic, wherein the decorating step includes:

forming projections by applying a first soil water on the outside of the half-dried ceramic using a rough brush and forming a plurality of projection roots; and growing projections by applying a second soil water on a plurality of the projection roots fifty to one hundred times using the brush and letting the projections dry at 15~20° C., and 60~70% of relative humidity for 15~25 minutes in the shade each time after the application; wherein the first soil water comprises 66~83.9% porcelain soil, 15~20% water, 1~13% pigment and 0.1~1% sodium silicate, and the second soil water comprises 56~78.9% porcelain soil, 20~30% water, 1~13% pigment and 0.1~1% sodium silicate.

14. The method of claim 13, wherein water content of the first soil water is controlled in consideration of the number of the projection roots to be formed on the outside of the ceramic, when the number of the projection roots to be formed on the outside of the ceramic is fifty to sixty per 5 cm×5 cm, the water content is 15%, and when the number of the projection roots to be formed on the outside of the ceramic is twenty to thirty per 5 cm×5 cm, the water content is 20%.

15. The method of claim 14, wherein the projections have two or more colors by using different color pigments in the second soil water at regular intervals.

16. The method of claim 13, wherein the step of growing projections is further including a step of controlling water content by applying the second soil water on the projection roots twenty five to fifty times, letting them dry each time after the application, sealing the ceramic with a vinyl cloth wrapper for about 12 hours and conforming water content of the projections to water content of the ceramic body.

17. The method of claim 16, after the step of controlling water content, the second soil water is being applied repeatedly without direction or with a specific direction with controlling its water content, wherein the water content of the second soil water is controlled by starting from 20% by increasing water at a rate of 0.2~0.4% per application or 2~4% per 10 applications to 30%, and the specific direction is one selected from directions of upward, downward, right, left, from right upside to left downside, from left downside to right upside, from left upside to right downside, and from right downside to left upside.

18. The method of claim 17, wherein the projections have two or more colors by using different color pigments in the second soil water at regular intervals.

19. The method of claim 16, wherein the projections have two or more colors by using different color pigments in the second soil water at regular intervals.

20. The method of claim 13, wherein the projections have two or more colors by using different color pigments in the second soil water at regular intervals.

* * * * *